United States Patent [19]

Fischer

[11] Patent Number: 4,618,825
[45] Date of Patent: Oct. 21, 1986

[54] ELECTRO-MAGNETIC THICKNESS MEASURING PROBE

[76] Inventor: Helmut Fischer, Industriestrasse 21, 7032 Sindelfingen-6, Fed. Rep. of Germany

[21] Appl. No.: 659,654

[22] Filed: Oct. 11, 1984

[51] Int. Cl.[4] .................. G01B 7/10; G01R 33/12
[52] U.S. Cl. ..................... 324/230; 324/262
[58] Field of Search ................. 324/229–231, 324/228, 260–262

[56] References Cited

U.S. PATENT DOCUMENTS

| | | | |
|---|---|---|---|
| 2,089,083 | 8/1937 | Arey | 324/129 |
| 2,751,552 | 6/1956 | Brenner et al. | 324/230 |
| 2,933,677 | 4/1960 | Lieber | 324/230 |
| 3,626,344 | 12/1971 | Shaternikov et al. | 324/230 X |
| 3,761,804 | 9/1973 | Steingroever | 324/230 |
| 4,005,360 | 1/1977 | Ott | 324/230 |
| 4,041,378 | 8/1977 | Ott | 324/262 |
| 4,204,159 | 5/1980 | Sarian et al. | 324/232 |
| 4,507,609 | 3/1985 | Madewell | 324/230 |

FOREIGN PATENT DOCUMENTS 3331407  3/1985  Fed. Rep. of Germany ...... 324/230

Primary Examiner—Gerard R. Strecker
Assistant Examiner—Warren S. Edmonds
Attorney, Agent, or Firm—M. R. Kestenbaum

[57] ABSTRACT

An electro-magnetic thickness measuring probe has a pot core which has a central bore, a pot chamber coaxial to the central bore accommodating a winding, and a pot rim. A pole-piece has one end fixed into the central bore and a free front-face with a coaxial recess machined therein such that an outer shell remains around the recess. A hard-metal pin is seated in the recess and has a front-face forming a crowned contact surface which stands a little proud of the pot rim. A coaxial annular disk made of highly permeable magnetic material has an outer edge in contact with the pot rim, a non-magnetic slot, and an intrados-radius surface having a diameter greater than the diameter of the pole-piece but significantly smaller than the diameter of the pot chamber. The intrados-radius surface lies close to the front-face of the pole-piece, whereby the magnetic resistance between the intrados-radius surface and the outer shell is significantly greater than the magnetic resistance between the intrados-radius surface and the free front-face when the measuring probe is set down on a surface.

19 Claims, 6 Drawing Figures

ELECTRO-MAGNETIC THICKNESS MEASURING PROBE

The present invention relates to an electro-magnetic thickness measuring probe.

BACKGROUND OF THE INVENTION

Certain electro-magnetic thickness measuring probes have a pot core which has a central bore, a pot chamber coaxial to the central bore accomodating a winding, and a pot rim. A pole-piece has one end fixed into the central bore and a free front-face with a coaxial recess machined therein such that an outer shell remains around the recess. A hard-metal pin is seated in the recess and has a front-face forming a crowned contact surface which stands a little proud of the pot rim.

These probes measure linearly, above all, in the region of thin coatings, avoiding the non-linearity problems which result from the magnetization curve as well as the geometry of the crowned contact surface. The probes also measure small specimens.

OBJECTS AND STATEMENT OF THE INVENTION

The objects of the invention are as follows:
(a) The thickness indication is to be more exact in the region of very thin coatings. For instance, in practice, even if probes currently in use are set down on an uncoated substrate, then, despite of the absence of a coating, a coating thickness is indicated.
(b) It is desired that a larger output signal is obtained for the same coating thickness which, of course, aids a better thickness indication.

These objects are achieved according to the invention, by means of a coaxial annular disk made of highly permeable magnetic material, having an outer edge in contact with the pot rim, and an intrados-radius surface having a diameter greater than the diameter of the pole-piece but significantly smaller than the diameter of the pot chamber. The intrados-radius surface lies close to the front-face of the pole-piece, whereby the magnetic resistance between the intrados-radius surface and outer shell is significantly greater than the magnetic resistance between the intrados-radius surface and the free front-face when the measuring probe is set down on a surface.

The invention has, among others, the following advantages:
1. The surface curvature plays an even less significant role.
2. Better measurements can be made on smaller specimens.
3. Almost the same or, in some cases, identical characteristics are obtained for markedly different substrates.
4. The power consumption is so small that the probe can be used in a battery instrument without an external power supply.
5. Despite the improved characteristics, the space for the windings is not enlarged, rather the same space for the windings is sufficient.
6. The probe is less sensitive to tilting.

Advantageously, the invention has the following additional features.

The annular disk has a radial slot. The feature allows the effect of the annular disk as a short-circuit winding to be reduced.

The radial slot passes through the disk. The feature allows the annular disk to have practically no short-circuit winding effect.

The pot core has a radial slot which adjoins the radial slot of the annular disk. The feature allows, in the same manner, any damping effect of the pot core to be avoided and, when the two slots are mutually aligned, allows the disadvantages of a possible bridging which could result in the appearance of damping anyway, to be avoided.

The radial slot of the pot core extends to its central bore. The feature allows the reduction in damping to be optimal for such cases in which the internal stress of the material allows the radial slot to be continued all the way through.

The diameter of the intrados-radius surface is approximately 1.5 to 2 times the diameter of the pole-piece immediately opposite the intrados-radius surface. The feature allows an optimization of the shunt on one hand and the bundelling of the fieled on the other. Factors which are too small bring with them a shunt. Factors which are too large cause bundelling.

The outer shell is constricted in the area of the pin. This is a further improvement within the scope of the object of the invention.

The constriction is circular cylindrical. The feature allows an axial-symmetric contriction which is easy to manufacture.

The constriction is conical. The feature allows measurements to be made in recesses such as grooves, etc..

The annular disk lies lower in the area of its intrados-radius surface than in the area of the pot rim. The feature allows the field to be better bundelled without approaching saturation. It is important that the field is bundelled as tightly together as possible without, however, becoming saturated, because saturation would falsify the result of the measurement.

The annular disk is embossed outwards in the form of the frustum of a cone. The feature allows the area which is embossed downwards to be obtained in a particularly easy manner during the manufacturing process.

The annular disk has a stamp fin, the bottom surface of which is ground flat. The features avoids field-line concentrations which would radiate from the points of the stamp-fin if it was serrated.

The pin has a magnetic permeability in the range of 40–80 Ho, particularly in the range of 60 Ho. The pin is made of an alloy of the type 10.5% Co; 6.5% Va; 7% Mo. The features allow those effects which the highly permeable disk 37 and the highly permeable cylinder 41 of West German patent application No. 33 31 407 have to be compensated, since these components are no longer to be found in the apparatus according to the invention. In the aforementioned patent application a low permeability hard metal of roughly the composition 48% WC; 15% Co; 2% TiC/TaC/NbS was used; this has now been replaced by a material of higher permeability.

Optimum values with regard to the precision of the coating thickness indication and the optimally large signal are allowed when the outer front-face of the hard-metal pin stands proud of the annular disk by 5–50%, preferably 30%, of the diameter of the intrados-radius surface.

A fine adjustment device is positioned at the pot core for adjusting the pole-piece during assembly. The feature allows the optimum of the above features to be particularly well adjusted.

A grub screw with a conical face is screwed into the pot core. A back face on the pole-piece has a bevel in contact with the conical face of the grub screw, and a second grub screw has a crowned front-face that presses on the pole-piece. The features allow the fine ajustment to be particularly easily effected. Naturally, the coils—as usual—are fixed and the pole-piece moves relatively to them in one direction, namely outwards, when the grub screw is screwed in.

DESCRIPTION OF THE DRAWINGS

The invention is now described using preferred illustrative embodiments. Because of the exact dimensions, millimeter scales are specified. The drawings show.

DETAILED DESCRIPTION

Figure 1:
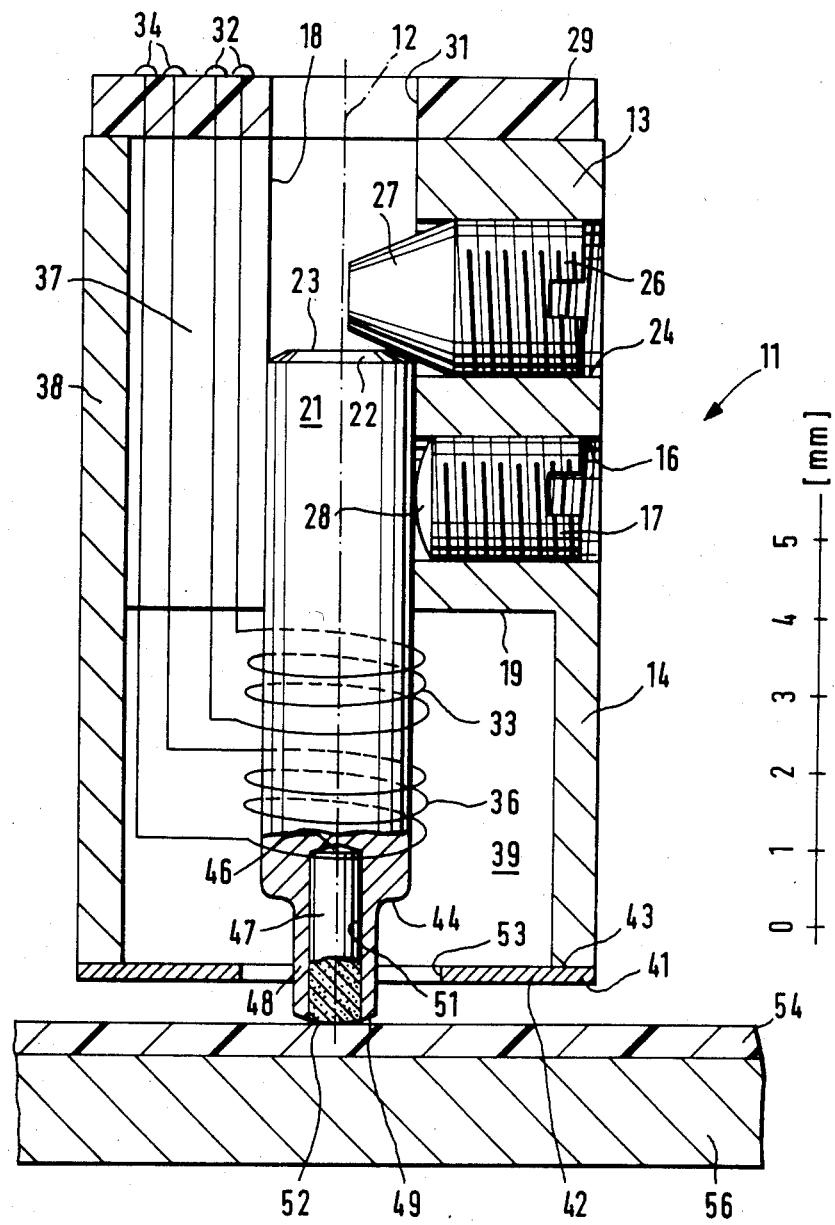
FIG. 1 a radial section through a set-down measuring probe of a first design example, FIG. 2 a similar section through a second design example, FIG. 3 a similar section through a third design example, FIG. 4 a curve which shows in comparison to the state-of-the-art how much better the indication for an uncoated substrate of one of the design examples is, also as a function of the diameter of the substrate which is in the form of a disk.

A pot core 11 of soft iron is rotationally-symmetric about its geometic longitudinal axis 12. It has a base 13 and a circular-cylindrical wall 14.

Near the base 13 in its lower half is a horizontal threaded through-bore 16. A grub screw 17 is screwed into said bore. Coaxial to the geometrical longitudinal axis 12, the base 13 has a through-bore 18 which, however, has a diameter substantially smaller than that of the internal face 19 of the base 13. A circular-cylindrical core 21 made of material of high magnetic permeability is located in the through-bore 18 as per the upper half of FIG. 1. Its top side 23 which has a bevel 22 is at the same height as a second threaded through-bore 24 which lies above and parallel to the threaded through-bore 16. A grub screw 26, the shaft of which is shaped as the frustum of a cone 27 and penetrates into the through-bore 18, is screwed into this. The angle of inclination of the bevel 22 corresponds to that of the taper on the frustum of the cone 27 so that, when the grub screw 26 is screwed inwards, the effect of its pitch is added to that of the pitch of the frustum 27 allowing the core 21 to be pushed downwards out of the bore with a correspondingly fine adjustment. The crowned leading face 28 of the grub screw 17 contacts under pressure the circumference of the core 21 supplying the friction which must be overcome when the grub screw 26 is screwed inwards. A plastic washer 29 which has a coaxial, central hole 31 of the same size is seated on the pot core 11.

Two terminals 32 for a exciter winding 33 are provided on the plastic washer 29. Two other terminals 34 on the plastic washer 29 are used for connecting the induction winding 36. The exciter winding 33 and the induction winding 36 are wound on formers which are fixed relative to the pot core 11. The core 31 can move throgh the winding.

In order to allow free passage for the wires running down from the terminals 32, 34 a vertical slot 37 is provided which lies radially, connected with the through-bore 18, however, which does not quite reach the outside, so that as per FIG. 1, a wall 38 remains left of the slot 37. Below the base face 19 coaxial to the geometrical longitudinal axis 12 is a circular-cylindrical winding space 39. The volume above the constriction described later is taken up by the exciter winding 33 and the induction winding 36. These are, naturally, not drawn to scale but only represented symbolically and have the usual configuration for this technique.

Under the circular-cylindrical wall 14 is an annular pot rim 41 which is of uniform thickness throughout and is polished so that the outer edge 43 of an annular disk 42 lies congruently and for the magnetic field lines practically lostless on it. The annular disk 42 is stuck onto the pot rim 41 with a very thin layer of adhesive so that there is practically no gap. A constriction 44, which is practically radial, on the core 21 starts within the space for the windings. The constriction 44 is located underneath the windings and underneath the top face 46 of a pin 47. Below the constriction 44 is a single monolithic circular-cylindrical shell 48, which is coaxial to the geometrical longitudinal axis 12. The lower lip of the shell 48 is formed as a crowned front face 49 forming part of a sphere, the center of which lies on the geometrical longitudinal axis. A circular-cylindrical, coaxial blind hole 51 is bored into the lower face of the core 21. This extends almost as far as the windings and beyond the constriction 44. The exact dimensions in this area are to be taken from the drawing. The bottom end of the pin 47 also has a crowned front-face 52 which also forms part of a sphere and represents a direct continuation of the crowned front-face 49. The intradosradius surface 53 lies at the indicated distance from the outer surface of the shell 48. It is coaxial to the longitudinal axis 12. The annular disk 42 has a permeability greater than 100 $\mu_o$, typically 1000 $\mu_o$. The crowned front-face 52 is positioned on the top surface of a coating 55 which is to be measured, which, for its part, is deposited on a substrate 56.

After the axial position of the core 21 has been adjusted, the space for the winding 39 is filled with cast resin. The pin 47 is made of a sintered hard metal as before and has a higher permeability than the pin 27 described in West German patent application P No. 33 31 407, namely in the range from 50 to 200 $\mu_o$.

Figure 2:
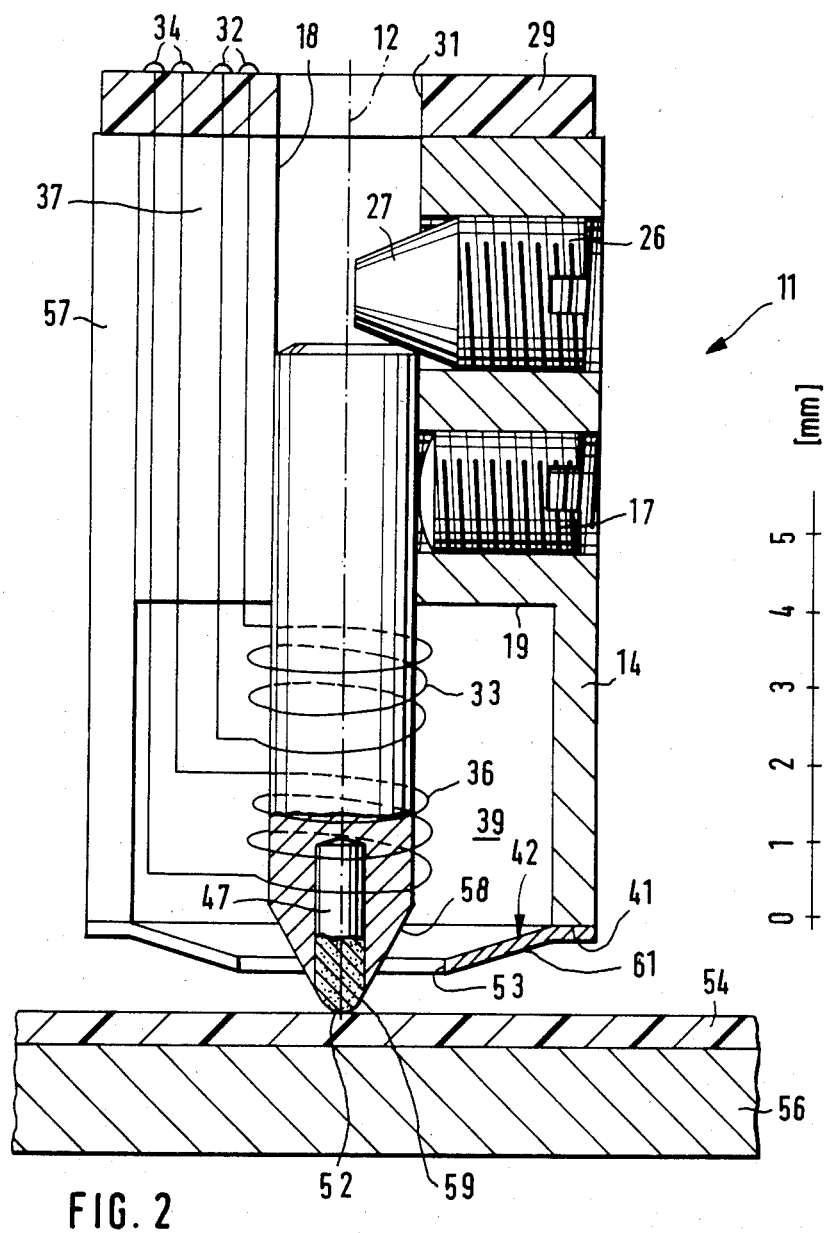

The design example as per FIG. 2 differs from the design example as per FIG. 1 in three points:

Firstly, the slot 37 is continued outwards by a through-slot 57 which extends parallel to the longitudinal axis 12 through the entire height of the pot core 11.

Secondly, a coaxial tapered face 58, lying on a circular cone, starts at the position where the constriction 44 is to be found in the first design example. Instead of the sudden reduction in cross-sectional area, therefore, this example has a gradual reduction in cross-sectional area. The tapered face 58 continues into a frustum of a cone 59 of the pin 47. The crowned front-face 52 is still present but has a smaller external radius. This design example is particularly suitable for measurements in grooves or other recesses.

Thirdly, the annular disk 52 is embossed outwards 61 in the form of a flat frustum of a cone. The pot rim 41 lies correspondingly higher so that the probe can no longer be tilted without the outside lower edge being set down on the surface of the coating 54. The intrados-radius surface 53 lies at such a position that the tapered face 58 and not the frustum of a cone 59 is opposite.

Figure 3:
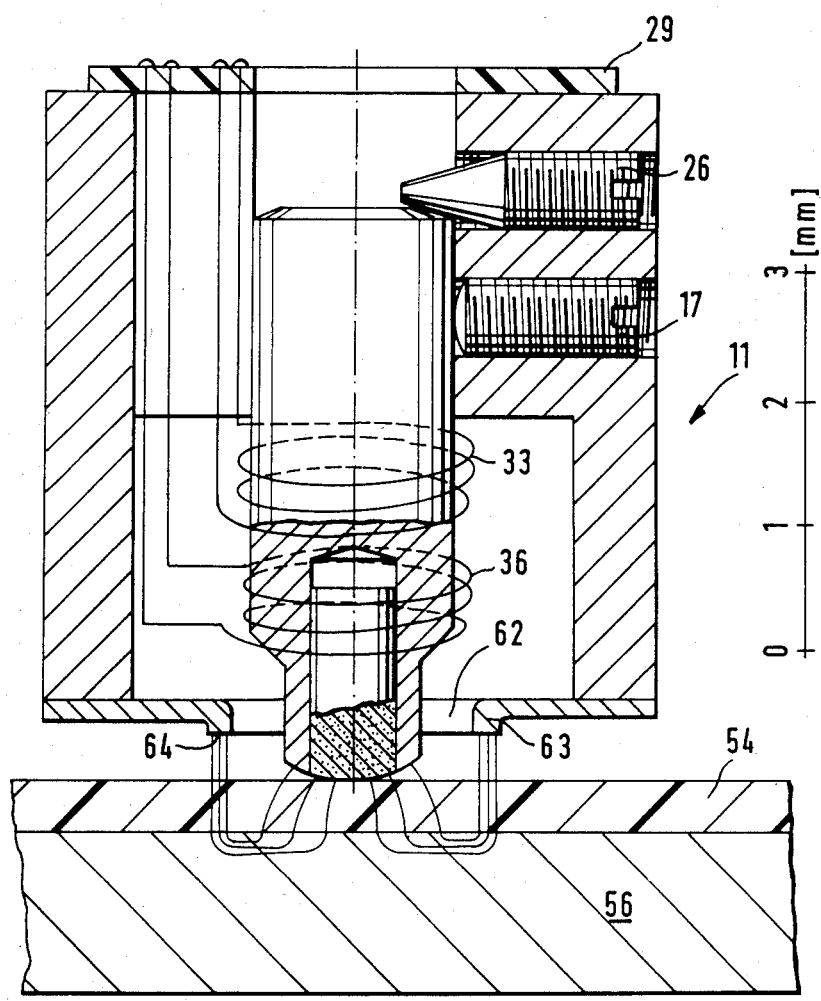

The design example as per FIG. 3 is similar to that in FIG. 1, but also in some features to that of the design example in FIG. 2. In this case, a coaxial, circular-cylindrical hole 62 is stamped during manufacture. The stamping produces a stamping fin 63 which points downwards, the protruding front-face 64 of which is ground so that the field lines can exit uniformly from this point.

Figure 6:
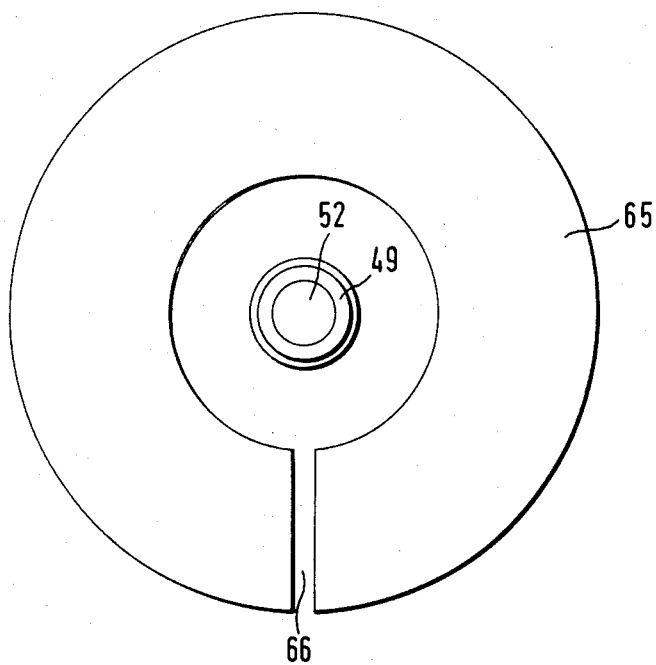
Figure 6:
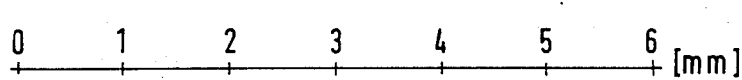

The annular disk 65 shown in FIG. 6 differs from the other annular disks in that it has a full through radial slot 66. If the annular disk 65 is used and the slot 57 is present for this design example, then, the radial slot 65 is aligned with the slot 57.

Figure 4:
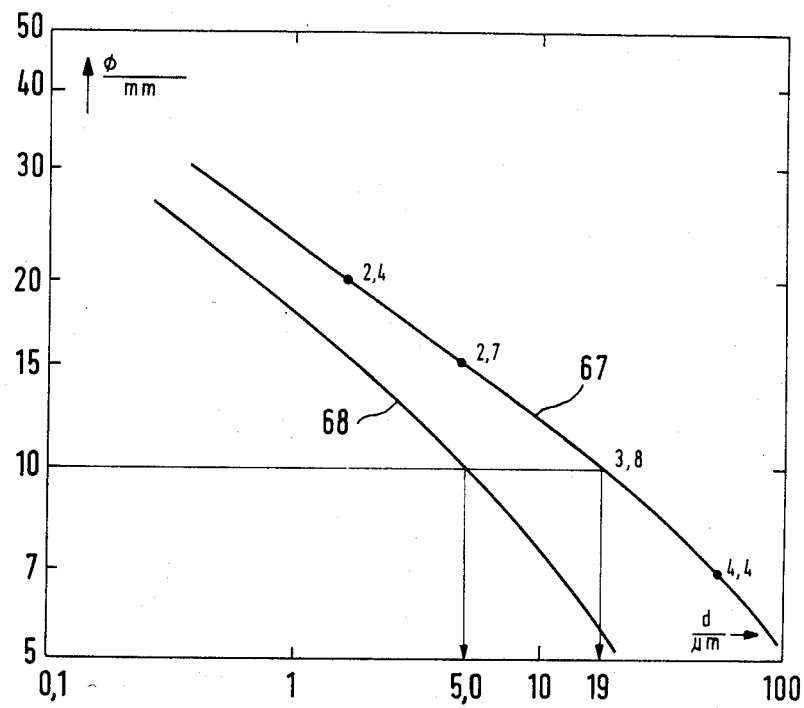

A probe as per the invention was set down on uncoated substrate disks of different diameters, the dimensions are shown in millimeters in FIG. 4. The first thing to note is that measurements can still be made, for example, on disks of 5 mm diameter. The coating thickness in $\mu m$ indicated by the instrument in accordance with the earlier patent application, shown by curve 67, is plotted to the right. In theory, an uncoated substrate must give a coating thickness of 0. The measurement error can be clearly seen. Moreover, it is also clear that the effect of limited area (edge effect) as the disk diameter becomes smaller is substantially smaller than for the probe to be improved.

The apparatus as per the invention has a curve as per curve 68. It can be seen that the apparatus as per the invention shows 5 $\mu m$ as opposed to 19 $\mu m$ for measurements on a disk of 10 mm diameter, an improvement by a factor of 3.8. This improvement is quite substantial. It can be seen from the trend that the improvement becomes greater as the disk diameter becomes smaller. A substantial improvement is also seen for disks of larger diameter, for example, for a 15 mm disk the factor is 2.7 and for a 20 mm disk the improvement of 2.4 lies well beyond that which is usual and can be expected for the technique.

Figure 5:
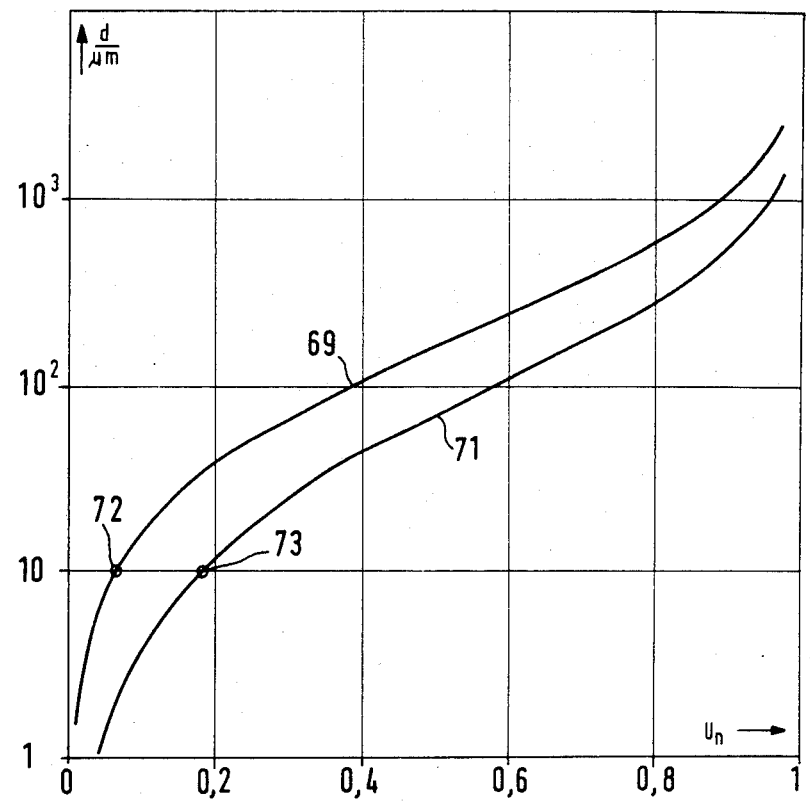
FIG. 5 a graph showing the improvement of the measuring signal in comparison to the state-of-the-art, FIG. 6 the bottom view of an annular disk for a modification of FIG. 1.

The apparatus as per the invention does more than indicate more exactly. The logarithmic coating thickness in $\mu m$ is plotted on the Y-axis in FIG. 5. The normalized output voltage at the induction winding 36 is plotted on the X-axis. Curve 69 represents the results obtained from a probe in accordance with the earlier patent application, whereas curve 71 shows the results for the present invention. If a coating thickness of 10 $\mu m$ is taken, for example, then, a normalized voltage of 0.065 at point 72 would have been found earlier. Due to the invention, a normalized voltage of 0.18 at 73 is now found, so that a roughly 300% improvement is obtained, which is quite definitely far beyond the usual improvements which could be expected and which (if at all) would normally be of only a few percent.

I claim:

1. An electro-magnetic thickness measuring probe having:
    a pot core of high permeable magnetic material which has a central bore, a pot chamber coaxial to the central bore accommodating a winding, and a pot rim,
    a pole-piece of high permeable magnetic material having one end fixed into the central bore and a free front-face with a coaxial recess machined therein such that an outer shell remains around the recess, and a hard-metal pin seated in the recess having a front-face forming a crowned contact surface which stands a little proud of the pot rim, and
    the improvement comprising:
    said pin being of low permeable magnetic material relative to the pole-piece
    a coaxial annular disk made of highly permeable magnetic material, slot extending from the intrados-radius surface to the outer edge, having an outer edge in contact with the pot rim, and an intrados-radius surface having a diameter greater than the diameter of the pole-piece but significantly smaller than the diameter of the pot chamber, said intrados-radius surface lying close to the front-face of the pole-piece, whereby the magnetic resistance between the intrados-radius surface and the outer shell is significantly greater than the magnetic resistance between the intrados-radius surface and the free front-face when the measuring probe is set down on a surface.

2. Probe as claimed in claim 1, wherein the annular disk has a radial slot.

3. Probe as claimed in claim 2, wherein the radial slot passes through the disk.

4. Probe as claimed in one of claims 2 or 3, wherein the pot core has a radial slot which adjoins the radial slot of the annular disk.

5. Probe as claimed in claim 4, wherein the radial slot of the pot core extends to its central bore.

6. Probe as claimed in claim 1, wherein the diameter of the intrados-radius surface is approximately 1.5 to 2 times the diameter of the pole-piece immediately opposite the intrados-radius surface.

7. Probe as claimed in claim 1, wherein the outer shell is constricted in the area of the pin.

8. Probe as claimed in claim 7, wherein the constriction is circular cylindrical.

9. Probe as claimed in claim 7, wherein the constriction is conical.

10. Probe as claimed in claim 1, wherein the annular disk lies lower in the area of its intrados-radius surface than in the area of the pot rim.

11. Probe as claimed in claim 10, wherein the annular disk is embossed outwards in the form of the frustum of a cone.

12. Probe as claimed in claim 10, wherein the annular disk has a stamp fin, the bottom surface of which is ground flat.

13. Probe as claimed in claim 1, wherein the pin has a magnetic permeability in the range of 40–80 $H_o$.

14. Probe as claimed in claim 13, wherein the magnetic permeability is in the range of 60 $H_o$.

15. Probe as claimed in claim 13, wherein the pin is made of an alloy of the type 10.5% Co; 6.5% Va; 7% Mo.

16. Probe as claimed in claim 1, wherein the outer front-face of the hard-metal pin stands proud of the annular disk by about 5–50% of the diameter of the intrados-radius surface.

17. Probe as claimed in claim 16, wherein the pin stands proud 30%.

18. Probe as claimed in claim 1, comprising a fine adjustment device positioned at the pot core for adjusting the pole-piece during assembly.

19. Probe as claimed in claim 18, comprising a grub screw with a conical face screwed into the pot core, a back face on the pole-piece having a bevel in contact with the conical face of the grub screw, and a second grub screw having a crowned front-face that presses on the pole-piece.

* * * * *